US008782081B2

(12) United States Patent
Guan et al.

(10) Patent No.: US 8,782,081 B2
(45) Date of Patent: Jul. 15, 2014

(54) QUERY TEMPLATE DEFINITION AND TRANSFORMATION

(75) Inventors: Mark Zhenguo Guan, Cupertino, CA (US); Sam Wu, Mountain View, CA (US)

(73) Assignee: GOOGLE Inc., Mountain View, CA (US)

( * ) Notice: Subject to any disclaimer, the term of this patent is extended or adjusted under 35 U.S.C. 154(b) by 56 days.

(21) Appl. No.: 13/105,016

(22) Filed: May 11, 2011

(65) Prior Publication Data
US 2012/0290620 A1 Nov. 15, 2012

(51) Int. Cl.
G06F 17/30 (2006.01)

(52) U.S. Cl.
USPC ........................................................ 707/779

(58) Field of Classification Search
USPC .................................................. 707/779
See application file for complete search history.

(56) References Cited

U.S. PATENT DOCUMENTS

| | | | |
|---|---|---|---|
| 6,826,727 | B1 | 11/2004 | Mohr et al. |
| 7,152,062 | B1 | 12/2006 | Draper et al. |
| 2005/0182758 | A1 | 8/2005 | Seitz et al. |
| 2008/0059950 | A1 | 3/2008 | Seitz et al. |
| 2010/0005078 | A1* | 1/2010 | Bayliss .............................. 707/4 |
| 2012/0150842 | A1* | 6/2012 | Ruiz ............................. 707/718 |

OTHER PUBLICATIONS

Springsource, Data access using JDBC, Apr. 19, 2010.*
Gaechter, Named Paramters within JDBC, Oct. 17, 2008.*
PHP, Function arguments, accessed Sep. 13, 2013.*
Java Optional method arguments_default values—AnandTech Forums, published 2004, accessed Sep. 13, 2013.*
Atkinson et al., Template Queries, May 20, 2007, retrieved Feb. 24, 2014.*
Huang L et al: "Admire: An Adaptive Data Model for Meta Search Engines", Computer Networks, Elsevier Science Publishers B.V., Amsterdam, NL, vol. 33, No. 1-6, Jun. 1, 2000, pp. 431-448, XP004304783, ISSN: 1389-1286, DOI: 10.1016/S1389-1286 (00) 00033-5 p. 444 "step 2" figure 5 section "4. Query capability mapping", first paragraph.
PCT International Search Report corresponding to PCT Application No. PCT/US2012/036555 filed May 4, 2012 (2 pages).
PCT Written Opinion of the International Searching Authority corresponding to PCT Application No. PCT/US2012/036555 filed May 4, 2012 (8 pages).

* cited by examiner

*Primary Examiner* — James Trujillo
*Assistant Examiner* — William Spieler
(74) *Attorney, Agent, or Firm* — Birch, Stewart, Kolasch & Birch, LLP

(57) ABSTRACT

A database query template and metadata mapping provide an end-user to generate customized database reports via a user interface. The parameters and data available to the end-user can be modified by editing the database query template and metadata mapping without modifications of the underlying system. A database query template includes query language keywords, variables, and template-tokens and defines the metrics, dimensions, data comparisons, filters, and aggregations available to an end-user. Template tokens include restriction tokens for comparing and filtering data, options-section-tokens for defining and omitting sections of the query template, and descriptor tokens for identifying dimensions and metrics of the database. The database query template is transformed into a database query based on values input by a user. The metadata mapping associates the variables of the database query template to the database data model and can include data constraints for validation of user input.

18 Claims, 7 Drawing Sheets

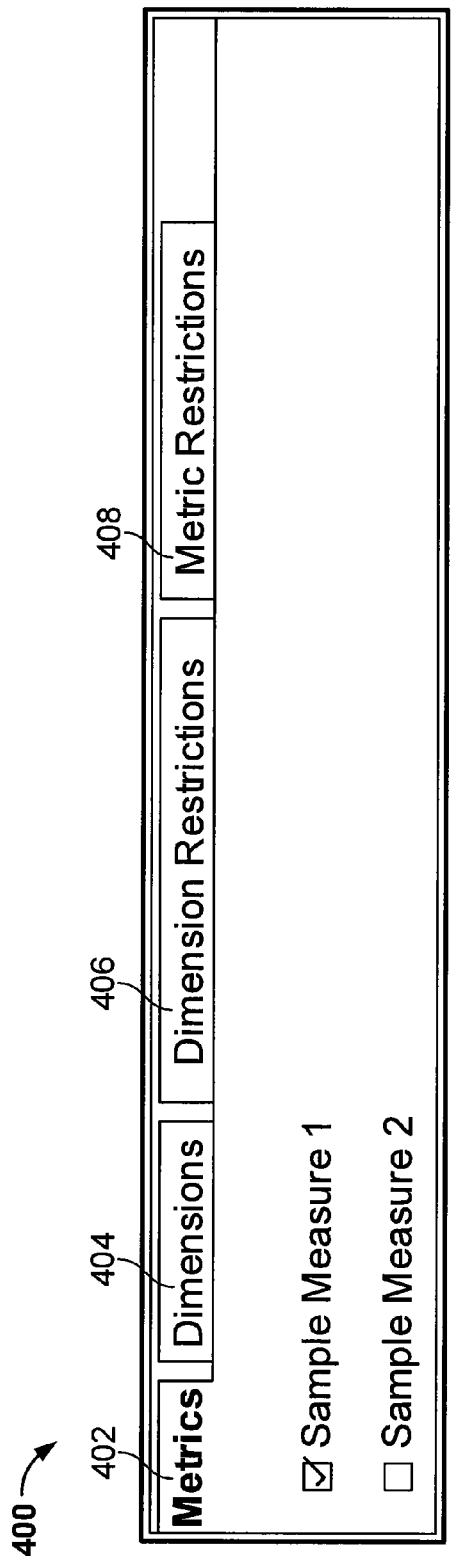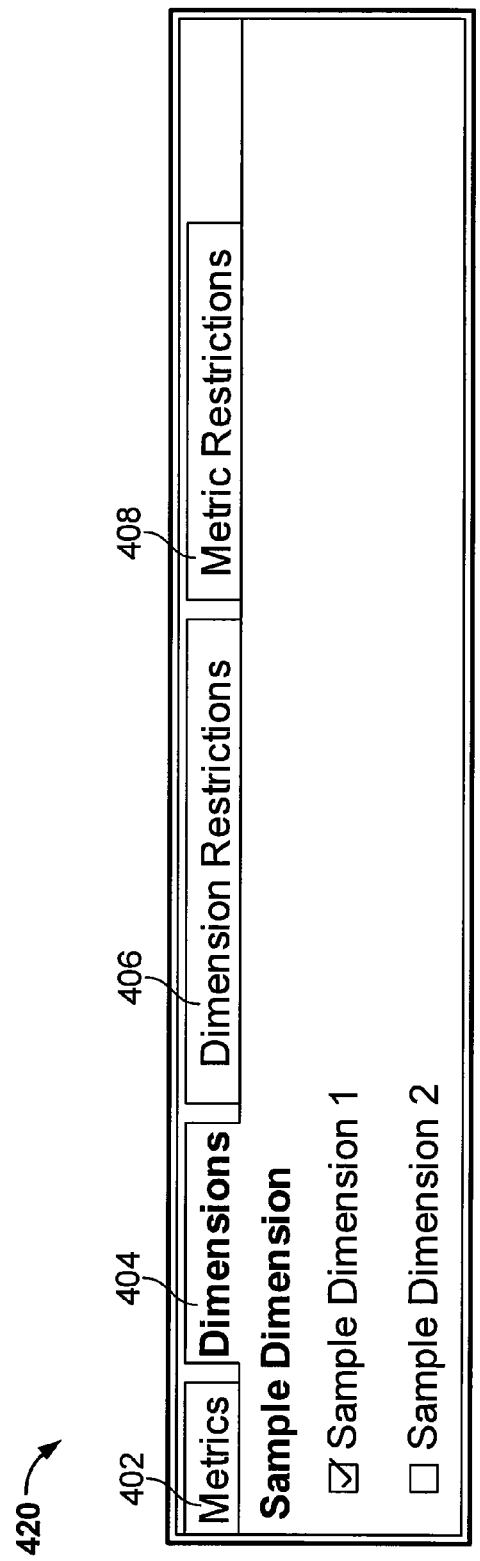

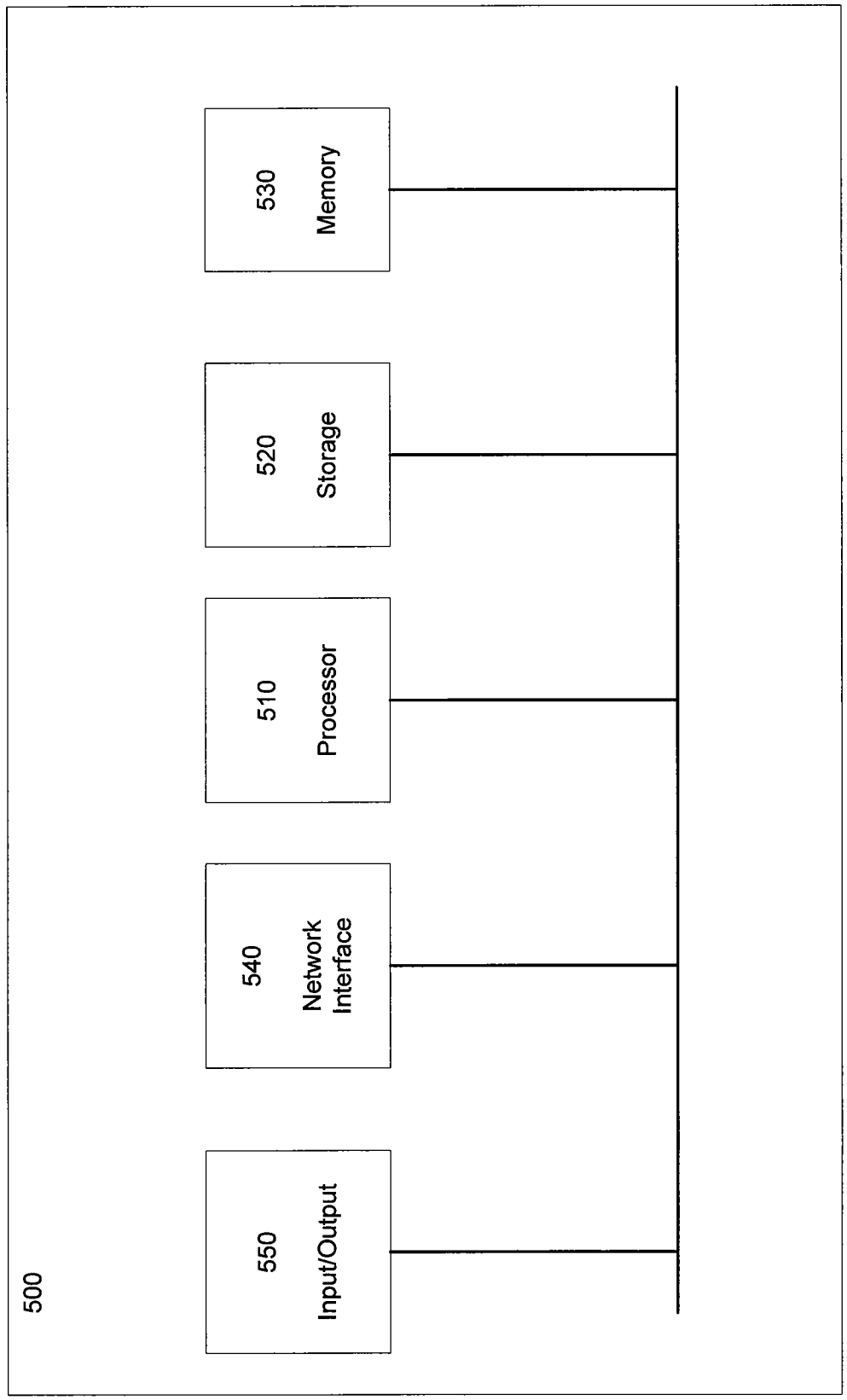

QUERY TEMPLATE DEFINITION AND TRANSFORMATION

FIELD OF THE INVENTION

The present invention is generally directed to defining database queries and database reports, and more particularly to a database query template and transformation of the database query template to a customizable database query for report generation.

BACKGROUND

Data of all varieties is increasingly stored in databases, and the number of people needing access to the data stored in databases is also increasing. Access to this data through present systems requires knowledge of database query languages, database Application Programming Interfaces (APIs), and programming languages. However, the typical end-user of the data stored in databases does not have experience in these technical areas and must therefore rely on predefined database queries and interfaces that have been created by other people (e.g., database programmers and administrators). Any modification to the database report required by the end-user requires a programmer or database administrator to modify the database query or software program used to access the database. Furthermore, the addition of any new database (e.g., a new database connected to a computing cloud) requires existing queries and interfaces to be modified to access the new database. Thus, the typical end-user cannot customize the reports generated by database applications, and modifications to available reports require extensive reprogramming and development.

SUMMARY OF THE INVENTION

In accordance with an embodiment, a database query is generated from a query template. The database query template includes query language keywords, variables, and template-tokens. The database query is generated by receiving one or more values each associated with a respective one of the variables and transforming the query template into the database query based on the received values, the variables, and the template-tokens.

In accordance with one feature, the template-tokens include a restriction-token, which has a default value and is associated with a respective one of the variables of the database query template. Transformation of the query template into the database query includes replacing the restriction-token with the default value in response to determining the associated variable is not assigned a value.

In accordance with a further feature, the template-tokens include an optional-section-token, which defines a query-template-section and is associated with one or more of the variables. Transformation of the template query into the database query includes omitting the query-template-section from the database query if none of the variables associated with the query-template-section are associated with a respective value.

In accordance with yet a further feature, the database query template is associated with a metadata mapping associating the variables to a data model of the database. The mapping can include an association of one or more of the variables with data constraints of the data model, such that the received values can be validated based on the data constraints associated with the respective variable of the received value.

These and other advantages of the invention will be apparent to those of ordinary skill in the art by reference to the following detailed description and the accompanying drawings.

BRIEF DESCRIPTION OF THE DRAWINGS

FIGS. 4A, 4B, 4C and 4D are diagrams of exemplary graphical user interfaces, which can be utilized in connection with the embodiments and features disclosed herein; and FIG. 5 is a high-level diagram of a computer in accordance with the embodiments and features disclosed herein.

DETAILED DESCRIPTION

The features and embodiments described herein enable an end-user who is not familiar with database data models or database queries to generate customized database reports via a user interface. The user interface enables a user to select various database dimensions and database measures of a dimensional database and specify data restrictions of those dimensions and measures. In a relational database, the user interface enables a user to select various columns and attributes, and specify data restrictions of values associated with various attributes. A person of ordinary skill in the art, in view of the disclosure herein, would understand that various embodiments of a query template can be adapted to other database models. For ease of discussion, query templates are generally discussed herein with respect to the dimensional model.

A query template translator transforms or re-writes a database query template (i.e., query template) and a metadata mapping into a database query based on user input to the user interface. The database query generated by the query template translator can be processed by a database server to produce a customized database report desired by a user. Thus, an end-user does not need an understanding of database programming or database query language in order to generate highly configurable database reports in accordance with the embodiments described herein.

The query template resembles a database query that specifies all of the data elements (e.g., dimensions, metrics, tables, etc.) and data restrictions (e.g., data value restrictions, filters, data comparisons, aggregations, etc.) that can be included in a query generated based on user input. A database programmer can generate the query template and metadata mapping based on the programmer's knowledge of the database data model, thereby abstracting the database model from the end-user.

Furthermore, the parameters and data available to the end-user can be rapidly expanded by the database programmer without significant modification or development of the underlying system. The database programmer, who understands the data model of a database and how to construct database queries, can use the features described herein to generate or modify a database query template and a metadata mapping describing the data model of the database. The database query template and metadata mapping can be encapsulated in a single file (e.g., XML file) for ease of transmission between systems and ensuring consistency across data models. The database query template and metadata mapping are mechanisms used for mapping a query to statements used for manipulating data within a database. Data manipulation may include storing, retrieving, updating, or deleting data.

Figure 1:
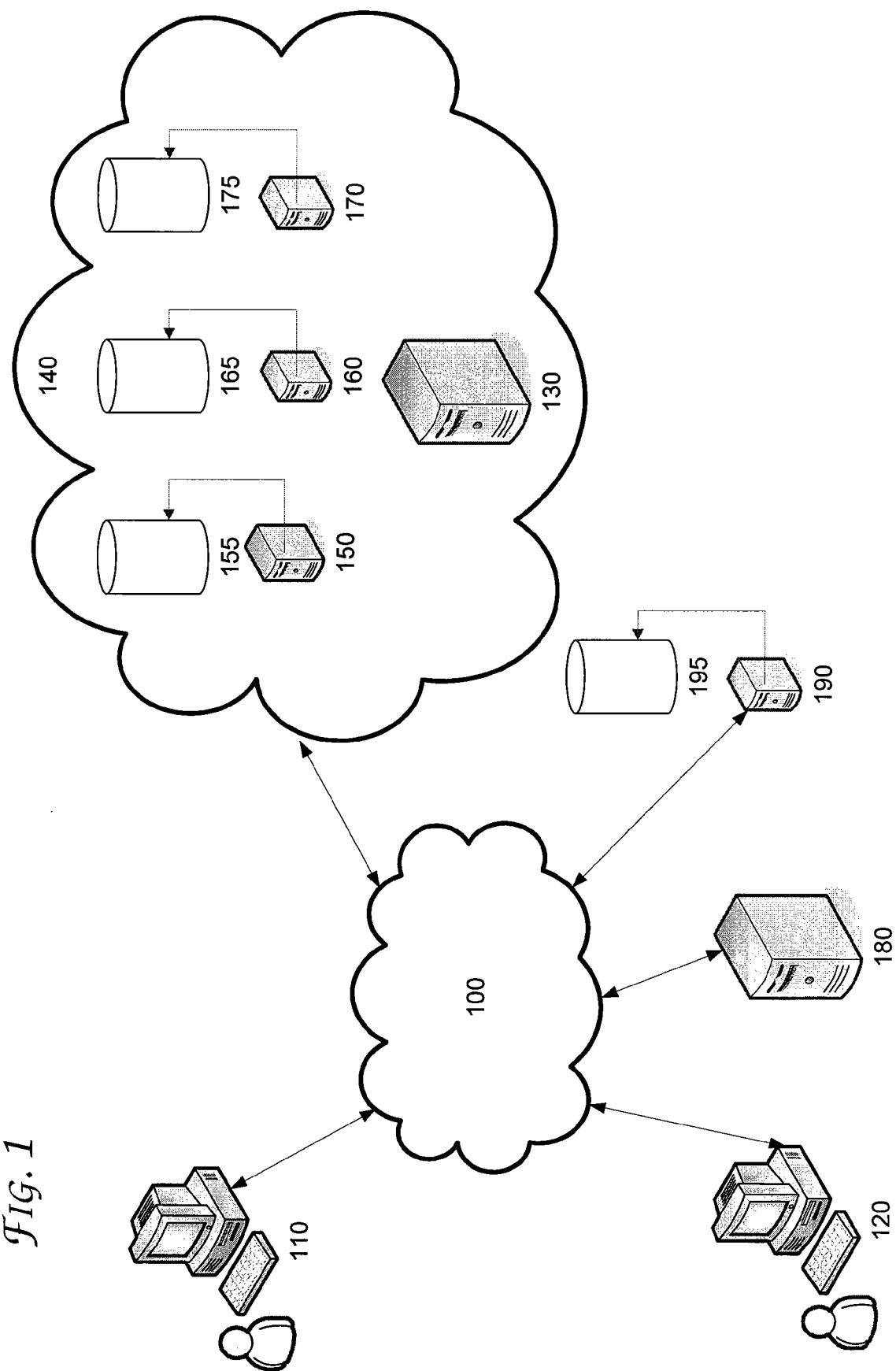
FIG. 1 is a diagram of an exemplary environment in which the embodiments and features disclosed herein may operate.

FIG. 1 is a diagram of an exemplary environment in which the embodiments and features disclosed herein may operate. The environment of FIG. 1 includes a network 100 over which various computers (e.g., computer 110, computer 120, and server 180) can communicate. Also in communication via the network 100 is cloud 140. As illustrated, cloud 140 includes server 130 as well as database servers 150, 160, and 170, having respective databases 155, 165, and 175. Servers 130 and 180 may include or provide database report management services (e.g., Report Management Servers). It should be noted that Report Management Servers (e.g., server 130 or server 180) and Database Servers (e.g., servers 150, 160 and 170) can be part of a cloud computing environment or outside of a cloud computing environment.

In the environment illustrated in FIG. 1, a user of computer 110 could access server 130 or 180, which can issue commands to, or access resources of, cloud 140. That is, an end-user could use an interface at computer 110 to input values that are used by server 130 or 180 to generate a database query that is issued to one or more database servers in the cloud 140.

Figure 2:
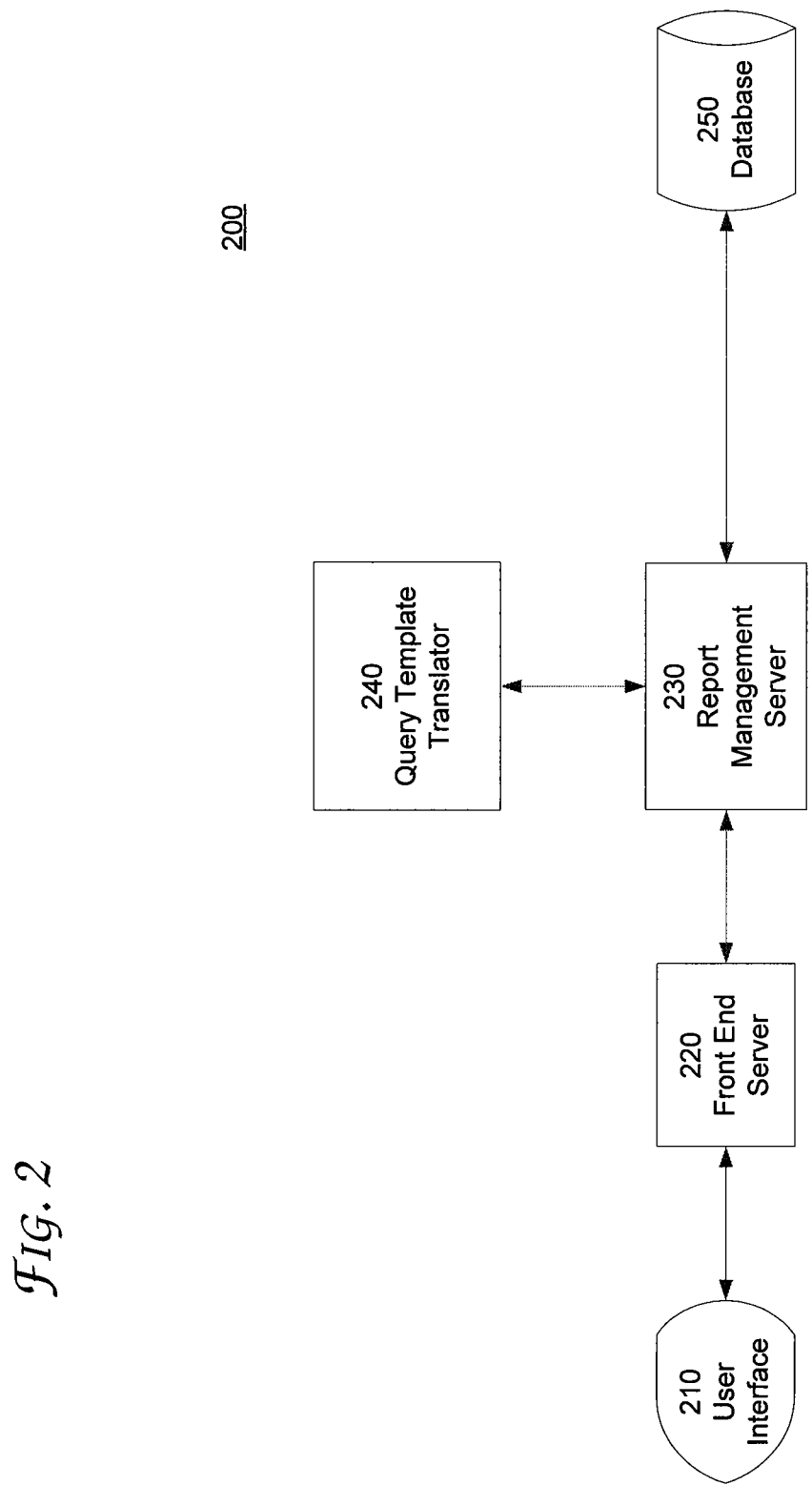
FIG. 2 is a diagram of an exemplary client-server network in accordance with the embodiments and features disclosed herein.

FIG. 2 is a diagram of an exemplary client-server network 200 in accordance with the embodiments and features disclosed herein. Specifically, FIG. 2 illustrates a user-interface 210, presented for example to a user of computer 110. The user-interface 210 can include a web-based interface (e.g., a web-page or applet) or a network client application. The user-interface 210 is in communication with front-end server 220.

The front-end server 220 can include a web-server or network application server that receives information from the user via the user-interface 210 regarding an information report desired by the user. The information report is typically generated by a database query. Accordingly, the user interface 210 enables the user to configure and initiate execution of a database query. However, most users do not understand database query languages or the programming APIs required to initiate execution of a database query. Accordingly, the front-end server 220 provides a user-interface 210 that enables a user to customize the database report by specifying dimensions and measures in which the user is interested and any restrictions on those dimensions and measures.

The front-end server 220 receives inputs from the user via user-interface 210 and conveys that information to the report management server 230. The report management server 230 uses the input received from the front-end server 220 to transform a database query template into a database query via query template translator 240. The query template translator 240 can be integrated into the report management server or a separate computing device. The query template translator 240 generates database queries based on the user input at user-interface 210, for example as described below in further detail with respect to FIGS. 3A and 3B.

The report management server 230 manages the various reports and queries available to the user via the user-interface 210 and is in communication with a database 250 to issue queries to the database 250. While the database 250 is illustrated as a single database, a person of ordinary skill in the art would understand that the report management server can control access to and coordinate retrieval of information from a cloud computing environment (such as cloud 140 of FIG. 1) including multiple databases and database servers.

The database query generated by the query template translator 240 is a text-based query, such as a Structured Query Language (SQL) statement. Thus, even though the end user may not understand SQL or any other database query language, based on the inputs from the user and the database query template, a text-based database query can be constructed. The text-based query can be executed at database 250, or any other database within the cloud 140. The results of the database query are received by report management server 230 and transmitted to the user via front-end server 220.

A database query template includes the general structure of a database query and includes certain database query language keywords. For example, a SQL-based database query template can include the keywords "SELECT," "FROM," "WHERE," "GROUP BY," "HAVING," and others. The database query template further includes various template-tokens and variables. Values are assigned to variables based on the input received through user interface 210. The template tokens can include embedded commands that are parsed and executed by database report management server 230. The embedded commands of the template tokens define certain aspects of the transformation of the database query template to the database query and are not visible to end-users. Template tokens represent a link between the database query template and the database query. Each template token references information that is necessary for the database query to be generated from transforming database query template. A template token can be associated with one or more variables, and the transformation of a specific template token is based on the assignment of a value to the variables associated with a specific template token. An exemplary description of template tokens given in the paragraphs below will illustrate how the assignment of values to variables associated with a template token causes a specific template token to transform.

The database query template can include a description of database and the reports that can be generated by the database query template. The description can include a metadata mapping of the database data model to the database query template. In one example, the metadata mapping is an XML file describing the dimensions and measures of the database. An exemplary XML file is as follows:

```
<dimensions>
    <dimension name="Sample Dimension" id="sample_dimension_1">
        <level name="Sample Dimension 1" id="sample_dimension_1"
        type="string">
            <schema_info>
                <sql column="column_name_1"/>
            </schema_info>
        </level>
        <level name="Sample Dimension 2" id="sample_dimension_2"
        type="string">
            <schema_info>
                <sql column="column_name_2"/>
            </schema_info>
        </level>
    </dimension>
</dimensions>
<measures>
    <measure name="Sample Measure 1" id="sample_measure_1" type=
    "int64">
        <schema_info>
            <sql column="SUM(column_name_3)"/>
        </schema_info>
    </measure>
```

-continued

```
    <measure name="Sample Measure 2" id="sample_measure_2" type=
    "int64">
      <schema_info>
        <sql column="SUM(column_name_4)"/>
      </schema_info>
    </measure>
</measures>
```

The above XML file metadata mapping defines two dimensions, "Sample Dimension 1" and "Sample Dimension 2." Sample Dimension 1 is associated with the identification "sample_dimension_1" and the database column "column_name_1." Sample Dimension 2 is associated with the identification "sample_dimension_2" and the database column "column_name_2."

The above XML file metadata mapping also defines measures, "Sample Measure 1" and "Sample Measure 2." Sample Measure 1 is associated with the identification "sample_measure_1" and the database column "SUM(column_name_2)." Sample Measure 2 is associated with the identification "sample_measure_2" and the database column "SUM(column_name_4)."

Additional information concerning the data model of the database can be specified within the metadata mapping. For example, data constraints can be specified with respect to the various dimensions and measures. For example, constraint data such as the acceptable range of data in a particular dimension can be specified. Additionally, the data type of each column can be specified, which can also be used as a data constraint. This constraint data can be used to validate user input received prior to generating the database report.

An exemplary database query template which can be used in conjunction with the above XML metadata mapping, is:

```
<bit_query>
  SELECT
    $COLUMN_SPEC:$sample_dimension_1,
    $COLUMN_SPEC:$sample_dimension_2,
    $COLUMN_SPEC:$sample_measure_1,
    $COLUMN_SPEC:$sample_measure_2
  FROM
    Table
  WHERE
    $RESTRICTION:DEFAULT=TRUE:$sample_dimension_1 AND
    $RESTRICTION:DEFAULT=TRUE:$sample_dimension_2
  $OPTIONAL:BEGIN
  GROUP BY
    $COLUMN_ALIAS:$sample_dimension_1,
    $COLUMN_ALIAS:$sample_dimension_2
  $OPTIONAL:END
  $OPTIONAL:BEGIN
  HAVING
    $RESTRICTION:DEFAULT=FALSE:$sample_measure_1 OR
    $RESTRICTION:DEFAULT=FALSE:$sample_measure_2
  $OPTIONAL:END
</bit_query>
```

The above database query template example includes template tokens $COLUMN_SPEC, $COLUMN_ALIAS, $RESTRICTION, and $OPTIONAL. The database query template also includes variables $sample_measure_1, $sample_measure_2, $sample_dimension_1, and $sample_dimension_2.

The $COLUMN_SPEC token is a descriptor token and defines a measure or dimension within a report. For example, with respect to the text "$COLUMN_SPEC:$sample_dimension_1," presented above, if the user has selected the database reference associated with $sample_dimension_1 (e.g., "Sample Dimension 1" in FIG. 4A), transformation of the database query template will replace the text with the column name associated with the $sample_dimension_1. Thus, as defined by the above metadata mapping, if a value is assigned to $sample_dimension_1, the text "$COLUMN_SPEC:$sample_dimension_1" is replaced with the column name "sample_dimension_1." In a further feature, the metadata mapping can also assign an alias identifier to the column. If an alias identifier is assigned, the text "$COLUMN_SPEC:$sample_dimension_1," presented is transformed to "column_name AS column_name_alias." If the variable $sample_dimension_1 is not selected, the text "$COLUMN_SPEC:$sample_dimension_1," is omitted from the database query when the database query template is transformed.

With respect to the token $COLUMN_SPEC, assignment of a value to an associated variable (e.g., $sample_dimension_1) can include a simple binary value to indicate whether the user desires that dimension or measure included in the report. Thus, the values assigned can include, for example, "true" or "false," "1" or "0," or null or any non-null value.

The token $COLUMN_ALIAS refers to the alias of a column, and can be used, for example, in a SQL "GROUP BY" statement. Transformation of the database query template to the database query replaces the text "$COLUMN_ALIAS:$variable" with the alias of the column defined in the XML metadata mapping. For example "$COLUMN_ALIAS:$sample_dimension_1" would be replaced by "sample_dimension_1."

The $RESTRICTION token is used to define a measure condition or dimension condition. The $RESTRICTION token can be associated with a default value to ensure the correctness of a Boolean expression in the database query. Thus, the $RESTRICTION token expression is typically written as "$RESTRICTION:DEFAULT=TRUE:$variable" or "$RESTRICTION:DEFAULT=FALSE:$variable." If a value is assigned to $variable, the $RESTRICTION token expression is re-written during transformation based on the value. If no value is assigned to $variable, the $RESTRICTION token express is re-written during transformation as the default value.

For example, with reference to the above XML metadata mapping, if a value of "is not 'X'" is assigned to the variable $sample_dimension_1, the text "$RESTRICTION:DEFAULT=TRUE:$sample_dimension_1," will be replaced with column name associated with $sample_dimension_1 (i.e., sample_dimension_1) and the value of the variable $sample_dimension_1 (i.e., "is not 'X'"), resulting in "sample_dimension_1 is not 'X'."

However, with respect to the text "$RESTRICTION:DEFAULT=TRUE:$sample_dimension_2," if no value is assigned to $sample_dimension_2, the text is replaced with the default value (i.e., "TRUE"). Thus, if a user is only concerned with sample_dimension_1 and is not concerned with sample_dimension_2 (i.e., no value is assigned to $sample_dimension_2), the "WHERE" expression of the above database query template will evaluate correctly because the restriction concerning sample_dimension_2 will always evaluate as TRUE.

A $RESTRICTION token expression can also be assigned an alias. The token $RESTRICTION_ALIAS can be used to refer to that alias in a manner similar to that discussed above with respect to $COLUMN_ALIAS.

The $OPTIONAL token can be used to define a query-template-section. That is, a set of database query template statements can be offset by a beginning (e.g., $OPTIONAL:BEGIN) and an ending (e.g., $OPTIONAL:END) to define an optional query-template-section. If the template-tokens within the query-template-section are not selected (e.g., values are not assigned to the variables associated with the template tokens), the query-template-section can be omitted from the database query during transformation of the database query template. If any of the tokens within the query-template-section have non-null values assigned to an associated variable, the query-template-section will not be omitted.

In the above example, if the user selects "Sample Measure 1" and "Sample Dimension 1," assigns the value "is not X" to $sample_dimension_1, and assigns the value ">100" to the "$sample_measure_1," the database query template will be transformed to the following SQL query, which can then be issued to the local data store:

```
SELECT
    column_name_1,
    SUM(column_name_3)
FROM
    table
WHERE
    column_name_1 is not 'X' AND
    TRUE
GROUP BY
    column_name_1
HAVING
    SUM(column_name_3) > 100 OR
    FALSE;
```

An exemplary transformation process is discussed below with respect to FIGS. 3A and 3B.

The XML file storing the metadata mapping can also store the database query template. For example, as illustrated above, the database query template identified as a bit_query element of an XML file (i.e., the database query template is set off by <bit_query> opening tag and </bit_query> closing tag).

The XML file can further include data regarding how to connect to the database. For example, the XML file can include the following information:

```
<connection_info>
    <mysql subtype="JDBC" database_name="sample_db" user_name="root" password="password">
        <jdbc>host:port</jdbc>
    </mysql>
</connection_info>
```

By incorporating the metadata mapping, database query template, and database connection information, the XML file can encapsulate all the information needed to generate a report. The report management server 230 would not require any intrinsic information about the database or the report, and would only need to understand and interpret the data contained in the XML file. Thus, the execution of the database query is completely abstracted from the generation of the database report. A database programmer can thereby expand the report options available and databases available to an end user simply by modifying the XML file and distributing the XML file to the front-end server. The database programmer would not be required to rewrite or modify any of the underlying infrastructure used to interpret the database query template and issued the database query.

Figure 3A:
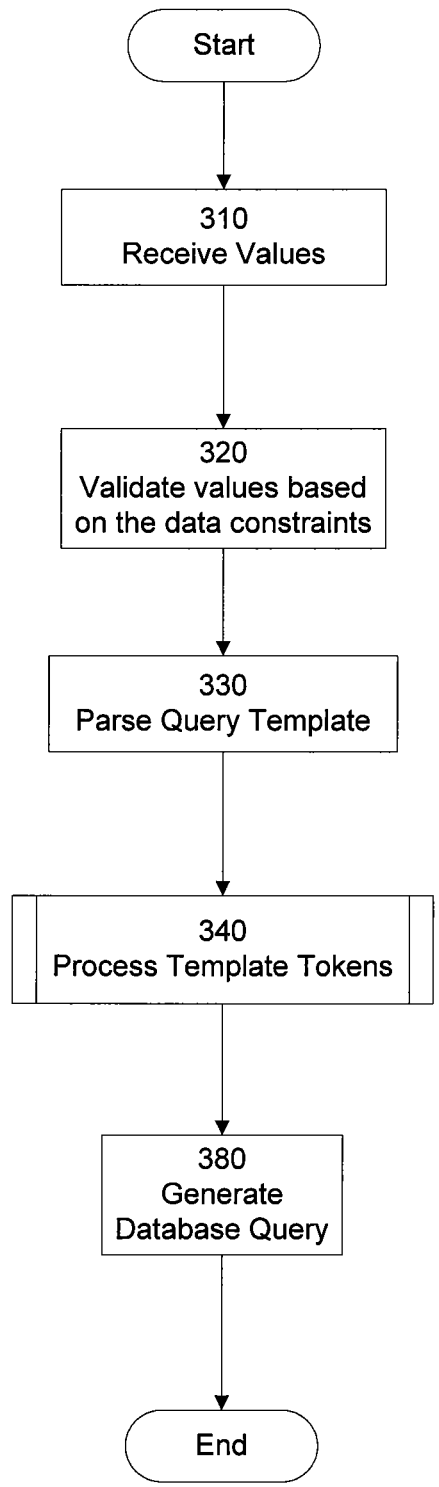
FIG. 3A is an exemplary flow diagram of a process for generating a database query based on a database query template in accordance with the embodiments and features disclosed herein.

FIG. 3A is an exemplary flow diagram of a process 300 for generating a database query based on a database query template in accordance with an embodiment. In accordance with various embodiments, process 300 can be executed by various elements of the client-server network illustrated in FIG. 2.

At step 310, a server (e.g., report management server 230, or servers 130 or 180) receives values associated with the variables in the database query template that specify the parameters of the database report. The values can be input by a user through a user interface (e.g., user interface 210), such as a graphical user interface. An exemplary graphical interface is discussed below with respect to FIGS. 4A, 4B, 4C, and 4D. Alternatively, values can be specified by a user and input via a web-based interface, such as a Java applet, HTML form, or web-based technology. In a further alternative, a text file can be edited by a user to input the values specifying the report parameters.

As noted above, the parameters of the database report may be constrained by certain data ranges or parameters. Accordingly, at step 320 the server validates the values based on data constraints. As discussed above, data constraints may be explicitly specified in the metadata mapping or may be inherent to the data-type.

At step 330, the server parses the query template, and at step 340, processes the template tokens. The process of step 340 is discussed in more detail with respect to FIG. 3B. After the template tokens are processed, the server generates the database query at step 380 based on the template tokens.

Figure 3B:
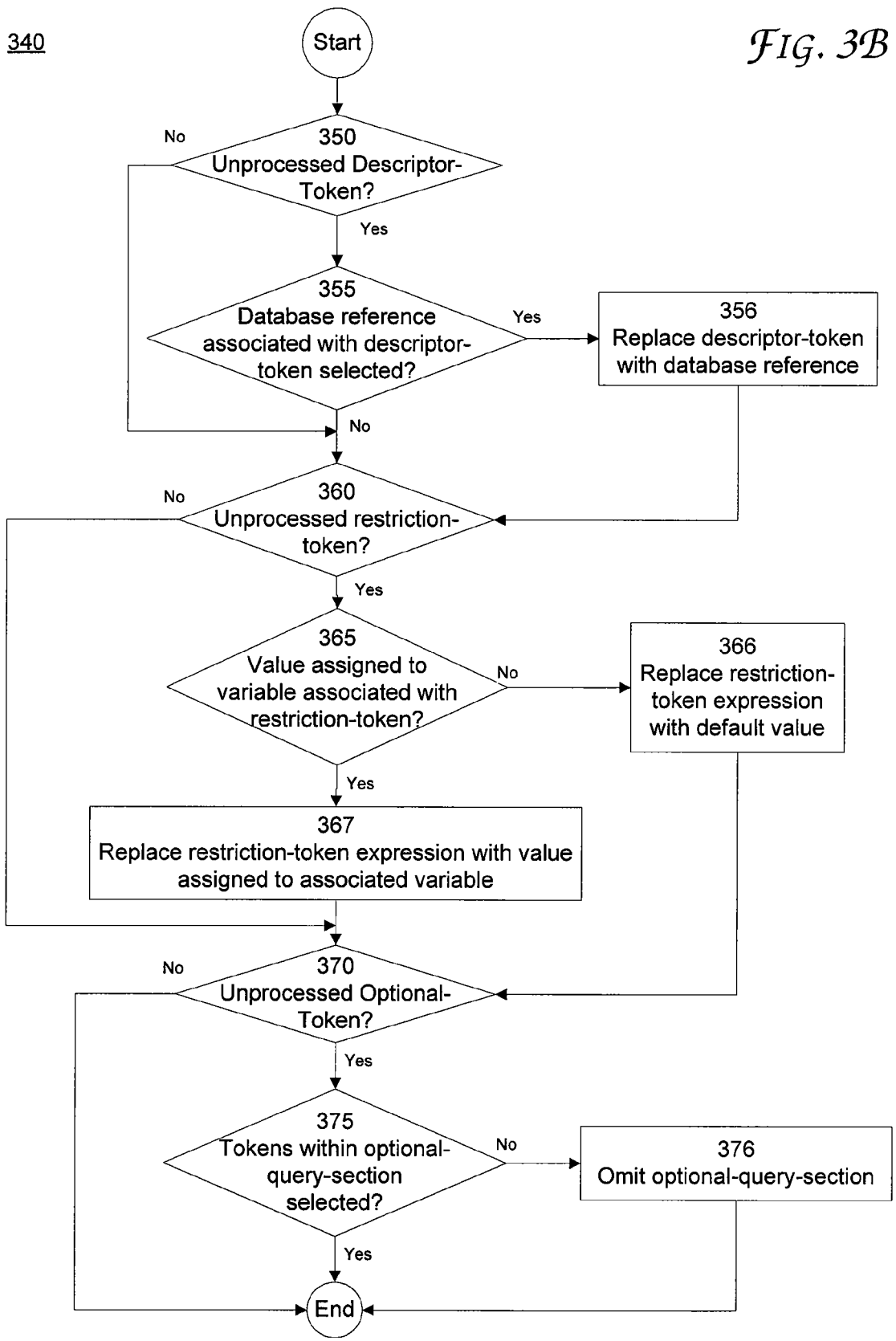
FIG. 3B is an exemplary flow diagram of a process for processing a database query template in accordance with the embodiments and features disclosed herein.

FIG. 3B is an exemplary flow diagram of process 340 for processing a database query template in accordance with an embodiment. While illustrated as processing a database query template by token type, a person of ordinary skill in the art would understand that other methods of traversal could be used to process a parsed database query template.

At decision 350, it is determined whether the database query template includes any unprocessed descriptor-tokens (e.g., $COLUMN_SPEC). If no unprocessed descriptor tokens exist, execution proceeds to decision 360. However, if unprocessed descriptor-tokens exist, at decision 355 it is determined whether the database reference associated with the descriptor token has been selected by the received values (e.g., whether a value has been assigned to the variable associated with the $COLUMN_SPEC token). If the database reference has been selected, for example by assigning a value to the associated variable, at step 356 the descriptor-token is replaced with the database reference. For example, the descriptor token is replaced by the column name associated with the variable of the descriptor token. If the database reference associated with the descriptor token is not selected, the descriptor-token is removed and execution proceeds to decision 360.

Restriction tokens (e.g., $RESTRICTION) can be processed next. Thus, at decision 360, it is determined whether any unprocessed restriction tokens remain in the database query template. If no unprocessed restriction tokens exist, execution proceeds to decision 370. However, if unprocessed restriction-tokens exist, at decision 365 it is determined whether a value is assigned to the variable associated with the restriction token. If no value is assigned to the variable, at step 366 the restriction token is replaced with the default value of the restriction token expression. However, if a value is assigned to the variable associated with the restriction token, the restriction-token expression is replaced with the value assigned to the associated variable.

At decision 370, it is determined whether the database query template includes any unprocessed optional-section tokens (e.g., $OPTIONAL:BEGIN or $OPTIONAL:END). If no unprocessed optional-section tokens exist, execution proceeds. However, if unprocessed optional-section tokens exist, at decision 375 it is determined whether the template tokens within the optional-query-section are selected. If any of the template tokens within the optional-query-section are selected, execution proceeds. However, if none of the template tokens within the optional-query-section are selected, at step 376 the optional-query-section is removed from the database query template so as to be omitted from the database query.

Similar actions to those discussed above with respect to descriptor-tokens, restriction-tokens, and optional-query-section tokens, can be used to process variable-tokens, column_alias tokens (e.g., $COLUMN_ALIAS), restriction alias tokens (e.g., $RESTRICTION_ALIAS), and others. In view of the foregoing, a person of ordinary skill in the art would understand the general pattern of processing and could adapt these procedures as desired to additional database query template token types.

While the user interface through which the user selects various dimensions and assigns values to variables can be implemented and presented in a variety of ways, for illustrative purposes an exemplary graphical user interface in accordance with an embodiment is discussed below with respect to FIGS. 4A, 4B, 4C, and 4D.

FIGS. 4A, 4B, 4C, and 4D are diagrams of exemplary graphical user interfaces, which can be displayed as part of user interface 210 at computer 110, and utilized in connection with the embodiments and features disclosed herein. Specifically, FIG. 4A includes a view 400 of a graphical user interface. The graphical user interface includes four tabs: a Metrics Tab 402, a Dimensions Tab 404, a Dimensions Restrictions Tab 406, and a Metric Restrictions Tab 408. In view 400, the user has selected the Metrics Tab 402. The dimensions may represent the scope of a query by a user and metrics may represent measurements quantifying the results of the query. The view 400 presented when the metrics tab 402 is selected lists the various metrics defined in the metadata mapping and includes a checkbox to allow a user to select particular metrics. As illustrated in view 400, metric "Sample Measure 1" is selected.

In view 420, presented in FIG. 4B, the user has selected the Dimensions Tab 402. View 420 lists the various dimensions defined in the metadata mapping and includes a checkbox to allow a user to select particular dimensions. As illustrated in view 420, metric "Sample Dimensions 1" is selected.

Figure 4C:
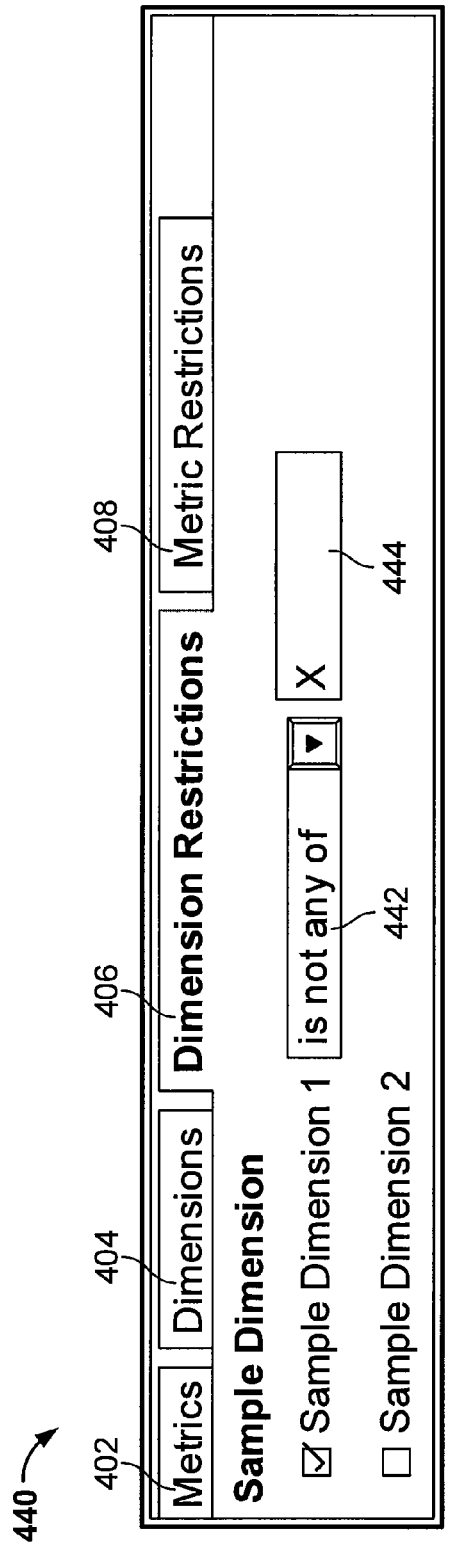

In view 440, presented in FIG. 4C, the user has selected the Dimensions Restrictions Tab 406. View 440 lists the various dimensions defined in the metadata mapping and includes a checkbox to allow a user to select particular dimensions to which a restriction should be applied. As illustrated in view 440, dimension "Sample Dimensions 1" is selected. For each selected dimension, a restriction operator drop down box 442 is presented and a restriction predicate text box 444 is presented. In this exemplary view 440, the user has selected the restriction operator "is not any of" in box 442 and the predicate "X" in box 444, thereby configuring the database query to only report items wherein Sample Dimension 1 is not any of X.

Figure 4D:
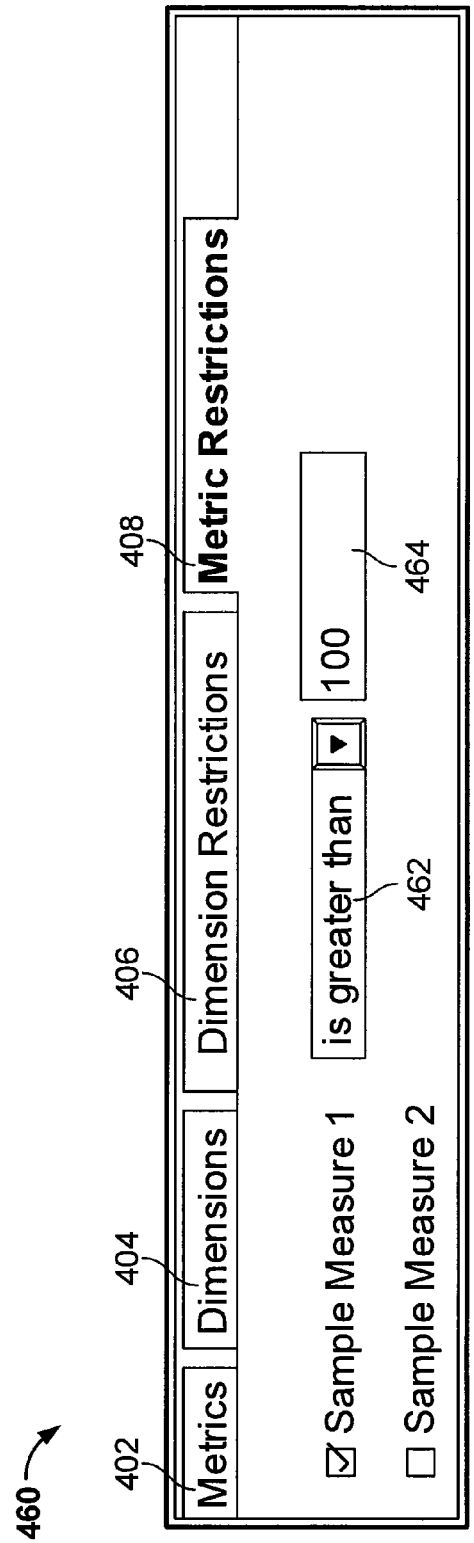

In view 460, presented in FIG. 4D, the user has selected the Metric Restrictions Tab 408. View 460 lists the various metrics defined in the metadata mapping and includes a checkbox to allow a user to select particular metrics to which a restriction should be applied. As illustrated in view 460, metric "Sample Metric 1" is selected. For each selected metric, a restriction operator drop down box 462 is presented and a restriction predicate text box 464 is presented. In this exemplary view 460, the user has selected the restriction operator "is greater than" in box 462 and the predicate "100" in box 464, thereby configuring the database query to only report items wherein Sample Metric 1 is greater than 100.

The selections and inputs to the graphical user interface described above with respect to FIGS. 4A, 4B, 4C, and 4D selects the same metrics, dimensions, and restrictions discussed above with respect to the exemplary database query template and metadata mapping. Therefore, the database query resulting from the transformation of the database query template will also be the same.

The above-described methods for generating a database query based on a database query template can be implemented on a computer or computing device using well-known computer processors, memory units, storage devices, computer software, and other components. A high-level diagram of a computer in accordance with the embodiments and features disclosed herein is illustrated in FIG. 5. For example, with reference to FIG. 1, computers 110 or 120, servers 130 and 180, and database servers 150, 160, 170, and 190 could be implemented with a computer similar to that described with respect to computer 500. Similarly, with respect to FIG. 2, front-end server 220 report management server 230, and query template translator 240 could be implemented with a computer similar to that described with respect to computer 500.

Computer 500 contains a processor 510, which controls the overall operation of the computer 500 by executing computer program instructions, which define such operations. The computer program instructions may be stored in a storage device 520, or other computer readable medium (e.g., magnetic disk, CD ROM, etc.), and loaded into memory 530 when execution of the computer program instructions is desired. Thus, the method steps of FIGS. 3A and 3B can be defined by the computer program instructions stored in the memory 530 and/or storage 520 and controlled by the processor 510 executing the computer program instructions. For example, the computer program instructions can be implemented as computer executable code programmed by one skilled in the art to perform an algorithm defined by the method steps of FIGS. 3A and 3B. Accordingly, by executing the computer program instructions, the processor 510 executes an algorithm defined by the method steps of FIGS. 3A and 3B. The computer 500 also includes one or more network interfaces 540 for communicating with other devices via a network. The computer 500 also includes input/output devices 550 that enable user interaction with the computer 500 (e.g., display, keyboard, mouse, speakers, buttons, etc.) For example input/output device 550 can include a display configured to present the graphical user interfaces discussed with respect to FIGS. 4A, 4B, 4C, and 4D and presented as the user interface 210 at computer 110. One skilled in the art will recognize that an implementation of an actual computer could contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention. The various functional modules that are shown are for illustrative purposes only, and may be combined, rearranged and/or otherwise modified.

We claim:

1. A computer implemented method of generating a database query based on a query template comprising a plurality of query language keywords, a plurality of variables, and a plurality of template-tokens, the method comprising:
    receiving at a computing device one or more values each associated with a respective one of the plurality of variables; and
    transforming the query template into the database query based on the one or more values, the plurality of variables, and the plurality of template-tokens, wherein the template-tokens include an optional-section-token defining a query-template-section and associated with one or more of the plurality of variables, and wherein transforming the template query into the database query comprises:
    processing each of said plurality of template-tokens, said processing including determining whether the template-token being processed is an optional-section token;
    in response to a determination that the template-token being processed is not an optional-section-token, replacing the token with a portion of a database query;
    in response to a determination that the template-token being processed is an optional-section token,
    determining whether all of said plurality of variables associated with the query-template section are associated with a null value;
    replacing the token with a portion of a database query based on a value of one or more variables from among said plurality of variables associated with the query-template section in response to determining that not all of said plurality of variables associated with the query-template section are associated with a null value; and
    omitting the query-template-section from the database query in response to determining that all of said plurality of variables associated with the query-template section are associated with a null value.

2. The computer implemented method of claim 1, wherein the template-tokens include embedded commands associated with transforming the query template into the database query.

3. The computer implemented method of claim 1, wherein the template-tokens include a restriction-token having a default value and associated with a respective one of the plurality of variables, and transforming the query template into the database query comprises:
    replacing the restriction-token with the default value in response to determining the respective one of the plurality of variables is not associated with a value.

4. The computer implemented method of claim 1, wherein the query template is associated with a metadata mapping associating the plurality of variables to a data model of the database.

5. The computer implemented method of claim 4, wherein the metadata mapping includes associating one or more of the plurality of variables with data constraints of the data model, the method further comprising:
    validating at least one of the received values based on the data constraints associated with the respective variable of the received value.

6. The computer implemented method of claim 1, wherein the template-tokens include a descriptor-token associated with a data field of the database, and transforming the query template into the database query further comprises:
    replacing the descriptor-token with an identification of the associated data field in response to determining one or more of the values received are associated with the data field.

7. A system for generating a database query based on a query template comprising a plurality of query language keywords, a plurality of variables, and a plurality of template-tokens, the system comprising:
    means for receiving one or more values each associated with a respective one of the plurality of variables; and
    means for transforming the query template into the database query based on the one or more values, the plurality of variables, and the plurality of template-tokens, wherein the template-tokens include an optional-section token defining a query-template-section and associated with one or more of the plurality of variables, and the means for transforming the template query into the database query comprises:
    means for processing each of said plurality of template-tokens, said means for processing performing processing including
        determining whether the template-token being processed is an optional-section token;
        in response to a determination that the template-token being processed is not an optional-section-token, replacing the token with a portion of a database query; and
        in response to a determination that the template-token being processed is an optional-section token, determining whether all of said plurality of variables associated with the query-template section are associated with a null value;
    means for replacing the token with a portion of a database query based on a value of one or more variables from among said plurality of variables associated with the query-template section in response to determining that not all of said plurality of variables associated with the query-template section are associated with a null value; and
    means for omitting the query-template-section from the database query in response to determining that all of said plurality of variables associated with the query-template section are associated with a null value.

8. The system of claim 7, wherein the template-tokens include embedded commands associated with transforming the query template into the database query.

9. The system of claim 7, wherein the template-tokens include a restriction-token having a default value and associated with a respective one of the plurality of variables, and the means for transforming the query template into the database query comprises:
    means for replacing the restriction-token with the default value in response to determining the respective one of the plurality of variables is not associated with a value.

10. The system of claim 7, wherein the query template is associated with a metadata mapping associating the plurality of variables to a data model of the database.

11. The system of claim 10, wherein the mapping includes an association of one or more of the plurality of variables with data constraints of the data model, the system further comprising:
    means for validating at least one of the received values based on the data constraints associated with the respective variable of the received value.

12. The system of claim 7, wherein the template-tokens include a descriptor-token associated with a data field of the database, and the means for transforming the query template into the database query comprises:

means for replacing the descriptor-token with an identification of the associated data field in response to determining one or more of the values received are associated with the data field.

13. A non-transitory computer readable medium encoding a database query template comprising:
  a plurality of query language keywords;
  a plurality of template-tokens each determining a string substitution; and a plurality of variables, each associated with a respective template-token, wherein each of the plurality of template-tokens determines a string substitution based on the variable associated with the respective template-token, and configured to be transformed into a database query based on the template-tokens and one or more received values each associated with a respective variable,
  wherein the plurality of template tokens includes an optional-section-token defining a query-template-section and associated with one or more of the plurality of variables; and
  wherein each of said plurality of template-tokens is processed, said processing including;
  determining whether the template-token being processed is an optional-section token;
  in response to a determination that the template-token being processed is not an optional-section-token, as part of the transformation of the database query template into the database query, replacing the token with a portion of a database query;
  in response to a determination that the template-token being processed is an optional-section token, determining whether all of said plurality of variables associated with the query-template section are associated with a null value;
  as part of the transformation of the database query template into the database query, replacing the token with a portion of a database query based on a value of one or more variables from among said plurality of variables associated with the query-template section in response to determining that not all of said plurality of variables associated with the query-template section are associated with a null value; and
  omitting, as part of the transformation of the database query template into the database query, the query-template section from the database query in response to determining that none of the received values are associated with the one or more of the plurality of variables associated with the optional section-token.

14. The computer readable medium of claim 13, wherein the template-tokens include embedded commands associated with transforming the query template into the database query.

15. The computer readable medium of claim 13, wherein the plurality of template-tokens includes a restriction-token having a default value such that transformation of the database query template into the database query replaces the restriction-token with the default value in response to determining none of the received values are associated with the variable associated with the restriction-token.

16. The computer readable medium of claim 13, further comprising a metadata mapping associating the plurality of variables to a data model of the database.

17. The computer readable medium of claim 16, wherein the metadata mapping associates one of more of the plurality of variables with data constraints of the data model.

18. The computer readable medium of claim 13, wherein the plurality of template-tokens includes a descriptor-token associated with a data field of the database such that transformation of the database query template into the database query replaces the descriptor-token with an identification of the associated data field in response to determining one or more of the values received are associated with the data field.

* * * * *